M. MANSON.
METHOD OF TEACHING AND ILLUSTRATING.
APPLICATION FILED MAR. 20, 1918.
1,289,849.
Patented Dec. 31, 1918.
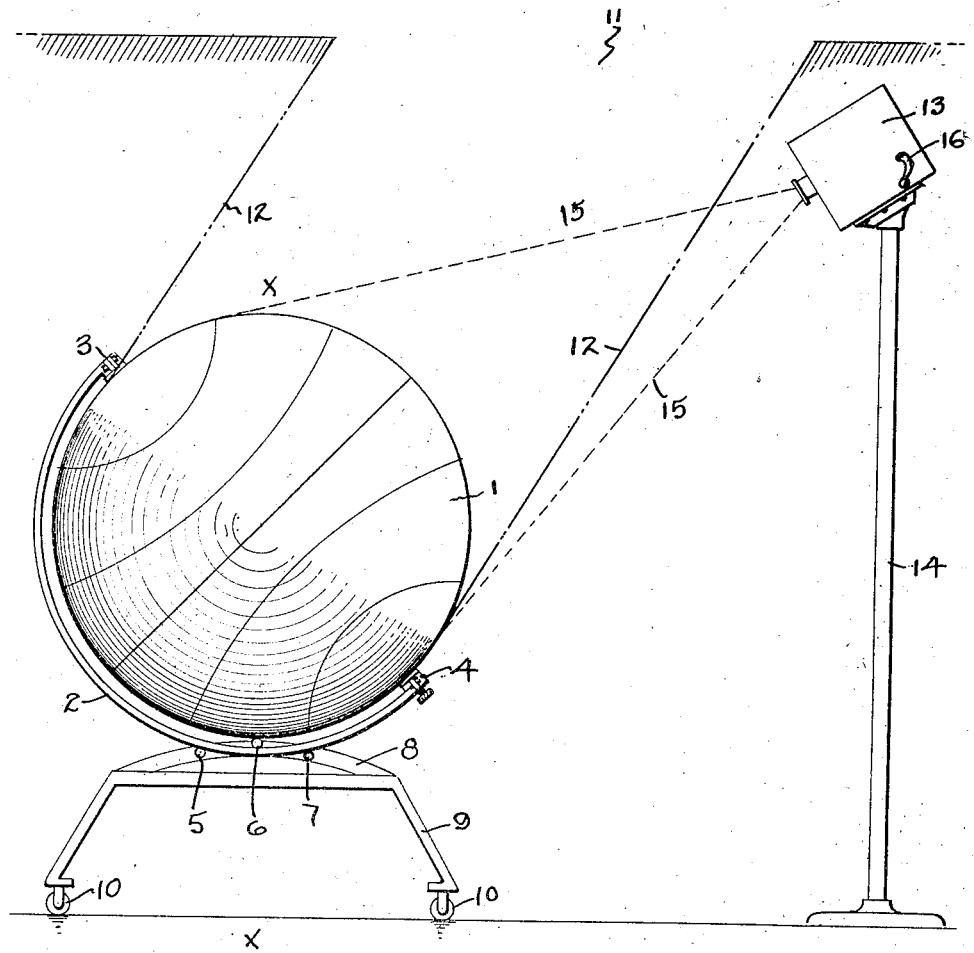
WITNESS
Lincoln Johnson
INVENTOR.
Marsden Manson
BY
Baldwin Wah
ATTORNEY

＝UNITED STATES PATENT OFFICE.

MARSDEN MANSON, OF BERKELEY, CALIFORNIA.

METHOD OF TEACHING AND ILLUSTRATING.

1,289,849.   Specification of Letters Patent.   Patented Dec. 31, 1918.

Application filed March 20, 1918. Serial No. 223,635.

*To all whom it may concern:*

Be it known that I, MARSDEN MANSON, a citizen of the United States, and a resident of the city of Berkeley, county of Alameda, and State of California, have made a new and useful invention—to wit, Improvements in Methods of Teaching and Illustrating; and I do hereby declare the following to be a full, clear, concise, and exact description of the same.

The invention relates particularly to the method of teaching or imparting information by visual representation.

Among the objects of this invention are to present the subject for instruction objectively in as true form as may be, combining realism, form, color and motion in such a manner that the modifying attributes of the subject may be comprehended at a glance in the evolutionary process of the subject. Other objects and advantages will appear as the description progresses.

In this specification and the annexed drawing the invention is embodied in the form considered to be the best, but it is to be understood that the invention is not limited to such form because it may be embodied in other forms, and it is also to be understood that in and by the claims following the description it is desired to cover the invention in whatever form it may be embodied.

In the accompanying one sheet of drawings:

The figure is a diagrammatic representation of a model globe representing the earth suitably mounted and arranged in accordance with this invention.

Attention is here directed to my Patent No. 784,058 issued March 7, 1905, and No. 1,042,455 issued Oct. 29, 1912.

In detail the construction illustrated in the drawings includes the globe 1 of any suitable construction, and having a surface adapted to receive treatment as hereinafter described.

This globe is supported by the sector 2, the opposite ends of which engage the opposite ends of a shaft passing through the globe on its polar axis as at 3 and 4, in such a manner that the globe is permitted free rotation on its axis. This sector 2 extends between the rollers 5, 6 and 7 rotatably mounted in the arcuate beam 8 forming part of the base 9 that is mounted upon the casters 10, which permit the whole structure to be moved about at will. The vertical center *x—x* of the base 9 passes through the center of the model globe. The sector 2 movable between the rollers 5 and 6 and 7 moves in an arc permitting the solstitial and intermediate presentation of the earth.

This globe structure is installed within a room having an opening, such as 11, in its ceiling, open to artificial or sun light, and adapted to illuminate the globe 1 in imitation of the sun rays striking the earth, the lateral limitation of the rays being represented by the interrupted lines 12—12. It is obvious that artificial light may be projected upon the globe in any suitable manner to accomplish the same resultant illumination.

A motion picture camera 13 mounted on the base 14 is arranged preferably as near as possible to the beam of illumination, such as the opening 11. The photo rays of the camera, represented by the dotted lines 15—15, are directed onto the illuminated portion of the globe for the purpose of taking a succession of motion pictures by turning the operating handle 16 of the camera in accordance with the conventional motion picture art.

In the operation of this invention the surface of the globe 1 is prepared in the form of a graphic representation of the information to be imparted. This is accomplished by building onto the surface in the form of bas relief or otherwise physical characteristics of the earth's surface, such as continents and their physical features, as bodies of water, and the like. By contrasting color, political or geographical divisional lines, or in any other manner, representing upon the surface of the globe conditions, such as variations in climate incidental to latitude or changes of seasons, such as distribution of animals and vegetation. Comparative rainfall or drought may be diagrammatically represented on the surface in different geographical regions. Daylight and moonlight through the 24 hours of the day can be accomplished by altering or modifying the light projected onto the globe. Statistical matters or other forms of information may be printed upon the globe or any graphic means resorted to for impressing a photographable image on the globe, all of which is progressively photographed by the camera 13, while the globe representing the earth is rotating upon its axis 3—4 and upon its sector 2, to represent the daily solstitial and intermediate presentations. The axial rotations are to be upon some suitable time scale of 24 hours, those in the plane of movement of the sector 2 in some time scale of the calendar year; for instance, the axial rotation upon a time scale of a second to a minute, or 1/60th of the 24 hours; and the movement upon the sector 2 upon a time scale of one half an hour to the year, or 1/17520th of a year, or other sub-multiples of the day and year. The two movements combined with proper lighting and coloring, as herein described, will illustrate the phenomena of day and night and of their seasonal changes and also the changes of the seasons. In the same manner data concerning military and civil history, the distribution of rainfall and climate, population, political geography, etc., and their variations depicted upon the globe are to be similarly photographed upon the film of the camera 13.

From the negative thus made in the camera 13 positives are made and adapted to be fed through a motion picture projecting machine, and projected upon the usual planal screen, giving thereupon the effect of a rotating globular representation of the earth, as though viewed by an observer located in interplanetary space, and giving a very impressive and memory-fixing representation of the information to be imparted, particularly valuable in the instruction of pupils from the primary to the most advanced stages of instruction.

A description of effect and *modus operandi* herein given are merely suggestive and capable of elaboration in the matter of physical treatment on the globe itself, light effects and other resources available in the motion picture art for bringing about the desired effects in a high state of development.

Having thus described this invention, what I claim and desire to secure by Letters Patent is:

1. The method of teaching consisting in graphically representing on the surface of a revoluble globe the information to be taught; taking a succession of photographic impressions of said globe while it is in motion and projecting such photographic impressions upon a suitable surface.

2. The method of teaching consisting in graphically representing on a movable surface the information to be taught; taking a succession of "motion" pictures of said surface while it is in motion, and projecting said pictures upon a still surface.

3. The method of teaching consisting in graphically representing upon the surface of a globe the information to be taught; revolving said globe upon its axis and moving said axis laterally; taking a succession of "motion" pictures of said globe while it is in motion; and projecting said pictures upon a still surface.

4. The method of teaching consisting of graphically representing on the surface of a globe the information to be taught; moving said globe to represent the axial solstitial and intermediate solstitial presentation of the earth; taking a succession of "motion" pictures of said globe while it is in motion; and projecting said pictures upon a still surface.

5. The method of teaching consisting in graphically representing on the surface of a globe the information to be taught; illuminating said globe to represent the sun's rays striking the earth; moving said globe to simulate the axial and solstitial and intermediate presentations of the earth; taking a succession of motion pictures of said globe while it is in motion and projecting said pictures upon a still surface.

In testimony whereof, I have hereunto set my hand at San Francisco, California, this 15th day of March 1918.

MARSDEN MANSON.

In presence of—
BALDWIN VALE,
LINCOLN V. JOHNSON.